United States Patent [19]

Terashima et al.

[11] Patent Number: 5,010,539
[45] Date of Patent: Apr. 23, 1991

[54] OPTICAL DISK DEVICE FOR STORING BOTH ANALOG AND DISCRETE DATA AND WHICH UTILIZES BOTH CLV AND CAV TECHNIQUES

[75] Inventors: Shigeo Terashima, Tenri; Kentaro Tsuji, Fukuoka; Hiroshi Fuji, Nara, all of Japan

[73] Assignee: Sharp Kabushiki Kaisha, Osaka, Japan

[21] Appl. No.: 301,583

[22] Filed: Jan. 26, 1989

[30] Foreign Application Priority Data

Jan. 29, 1988 [JP] Japan .................................. 63-20478

[51] Int. Cl.$^5$ .............................................. G11B 7/00
[52] U.S. Cl. .......................................... 369/50; 369/58; 369/267; 369/133; 369/240; 358/342
[58] Field of Search ............. 358/342; 360/114, 73.03; 369/13, 50, 47, 58, 54, 53, 59, 56, 267

[56] References Cited

U.S. PATENT DOCUMENTS 4,789,975  12/1988  Taniyama ............................ 369/50

OTHER PUBLICATIONS

Denpa Sinbun (Jun. 27, 1987).

Primary Examiner—Robert L. Richardson

[57] ABSTRACT

A optical disk recording and reproducing device capable of recording and reproducing data to or from an optical disk. Continuous signals representing continuous analog information such as audio and video information and discrete signals representing discrete data-information such as numerical data including program codes or character data are recorded dividedly in different recording regions provided on an optical disk including erasable or write once-type disks. The optical disk is rotated at a given linear or rotary angular speed under control by a disk rotation control device so as to simplify rotational control of the optical disk in accessing the information in the divided regions.

8 Claims, 2 Drawing Sheets

OPTICAL DISK DEVICE FOR STORING BOTH ANALOG AND DISCRETE DATA AND WHICH UTILIZES BOTH CLV AND CAV TECHNIQUES

FIELD OF THE INVENTION

The present invention relates to an optical disk recording and reproducing device for recording of various signals in an erasable-type optical disk and a write once-type optical disk for reproduction of such information therefrom.

BACKGROUND OF THE INVENTION

With ordinary computers, it is often the case that numerical or character data of a discrete nature almost irrelevant to one another are processed together. And, when recording or reproducing discrete signals representing such discrete data information, no error with regard to any signal is, as a rule, permissible. If, therefore, there should be any defect or missing part about the data contained when such discrete signals recorded in an optical disk or the like are to be reproduced, it is essential to restore the original data perfectly.

Hence, recording discrete signals such as mentioned above has to be made by a highly reliable recording method capable of restoring original data by the use of a powerful error-correcting means.

However, with regard to continuous signals representing continuous analog information such as music or video-information, there is a strong interrelation between adjacent pieces of data. Hence if there should be some defect or missing part in a given data, correction by interpolation is feasible to some extent by the aid of an error-correcting means with its presuming capability. Thus, there is little worry about any fatal damage.

Moreover, this error-correcting means, compared with the aforementioned counterpart, has the advantages of being less in the required number of redundant bits and simplified in circuit composition. Further, it is capable of largely compressing data, this resulting in a substantially longer time of recording.

With such continuous signals, a significantly larger amount of information is recordable on the medium as compared with discrete signals.

Conventional optical disk recording and reproducing devices seldom record discrete signals and continuous signals together. By recording mixed signals on an optical disk, the treatment required for recording the discrete signals has to be applied to all signals; thus resulting in an increased loss in recording continuous signals and in a decreased storage capacity.

Some known a types of optical disks are capable of recording various signals such as a CD-ROM [Compact Disk-ROM]. With CD-I [Compact Disk-Interactive Media], it is possible to record discrete signals consisting of application programs and continuous signals representing video- and audio-information in the CD-I region along the inner periphery of the disk. In the outer peripheral region of this CD-I it is also possible to record digital audio signals of a CD-type.

These known types of CD-ROM were invariably intended for recording signals in the form of pits fixed on the disk and hence only suitable for reproduction or play-back.

SUMMARY OF THE INVENTION

It is a primary object of the present invention to provide an optical disk recording and reproducing device capable of recording continuous signals representing analog information such as audio- or video information with discrete signals representing discrete data-information such as numerical data and character data including program codes mixed on an erasable-type or write once-type optical disk. The aforementioned continuous signals representing analog information include, for example, analog signals for audio or video information FM-modulated for recording and digital signals encoded by the PCM method. The discrete signals showing discrete data-information are all digital signals.

Another object of the present invention is to provide an optical disk recording and reproducing device enabling improvement of utilization efficiency of an optical disk to substantially increase the recording capacity thereof with regard to recording of the aforementioned continuous signals and also capable of recording describe signals with an improved reliability.

Still another object of the present invention is to provide an optical disk recording and reproducing device capable of simplifying control of the rotating speed of the optical disk by the use of a disk rotation control device, regardless of the kind of signals to be recorded or reproduced.

In order to accomplish these objects, the present invention relates to an optical disk recording and reproducing device for recording information an or reproducing information therefrom an optical disk. Continuous signals representing continuous analog information and discrete signals representing discrete data-information are arranged dividedly in different recording regions on the optical disk. The device also includes disk rotation control device for rotating an optical disk at a given linear speed or rotary angular speed regardless of the region to be accessed.

The aforesaid optical disk may be of the erasable type, such as magneto-optical disk, with which the recorded signals may be erased for recording of new signals repeatedly, if necessary, or of the write once type with which recording of signals is feasible only once.

The aforementioned condition of continuous signals representing continuous analog information and discrete signals representing discrete data information being arranged dividedly in different recording regions on the optical disk includes, for instance, continuous signals and discrete signals arranged dividedly in the inner portion of peripheral tracks and the outer portion thereof respectively. When continuous signals are be accessed, the optical pickup is first to moved to a recording region on the inner periphery side of the disk for starting the recording or reproducing process started therefrom. When, on the other hand, discrete signals are to be accessed, the optical pickup is first moved to a recording region on the outer periphery side for starting the recording or reproducing process.

Continuous signals representing continuous analog information may also be recorded on the optical disk in a compressed form.

Also, the optical disk may be provided with a directory for controlling the pieces of information recorded therein and to enable quick, random access to numerical as well as other data.

For recording or reproducing of signals, the so-called pre-pit method may be adopted for signals recorded in or reproduced from the optical disk having pits pre-formed in the tracks thereof or, alternatively, the soft-formatting method, in which recording or reproducing of signals is made on the optical disk with no pits preformed in the tracks.

It is also possible to use an optical disk with pits preformed in the tracks only in some regions for recording or reproducing continuous signals representing continuous analog information in the region/s with preformed pits of the optical disk by the pre-pit method, while recording or reproducing discrete signals for discrete data information in the region/s with no preformed pits by the soft-formatting method.

BRIEF DESCRIPTION OF THE DRAWINGS

The present invention will become more fully understood from the detailed description given hereinbelow, and the accompanying drawings which are given by way of illustration only, and thus are not limitative of the present invention, and wherein.

DESCRIPTION OF THE EMBODIMENTS

A preferred embodiment of the present invention is described below under reference to FIGS. 1 through 3.

In this embodiment a magneto-optical disk 1 in CD size (120 mm in diameter) is used as optical disk.

Figure 1:
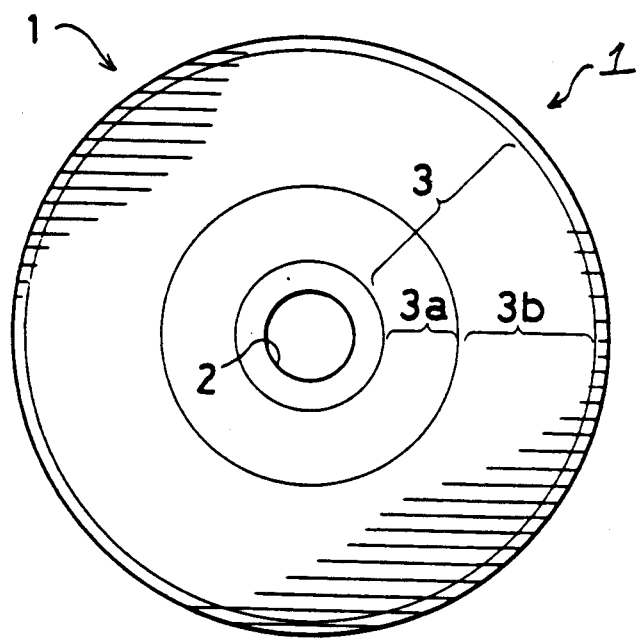
FIG. 1 is a plan view of a magneto-optical disk.
Figure 2:
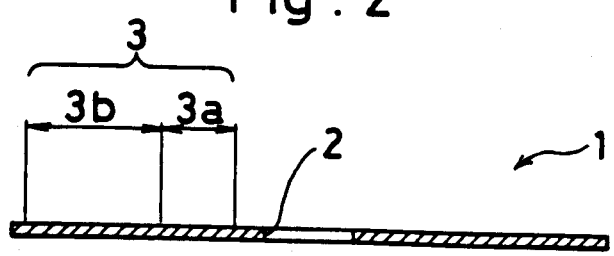
FIG. 2 is a front elevation of a magneto-optical disk.
Figure 3:
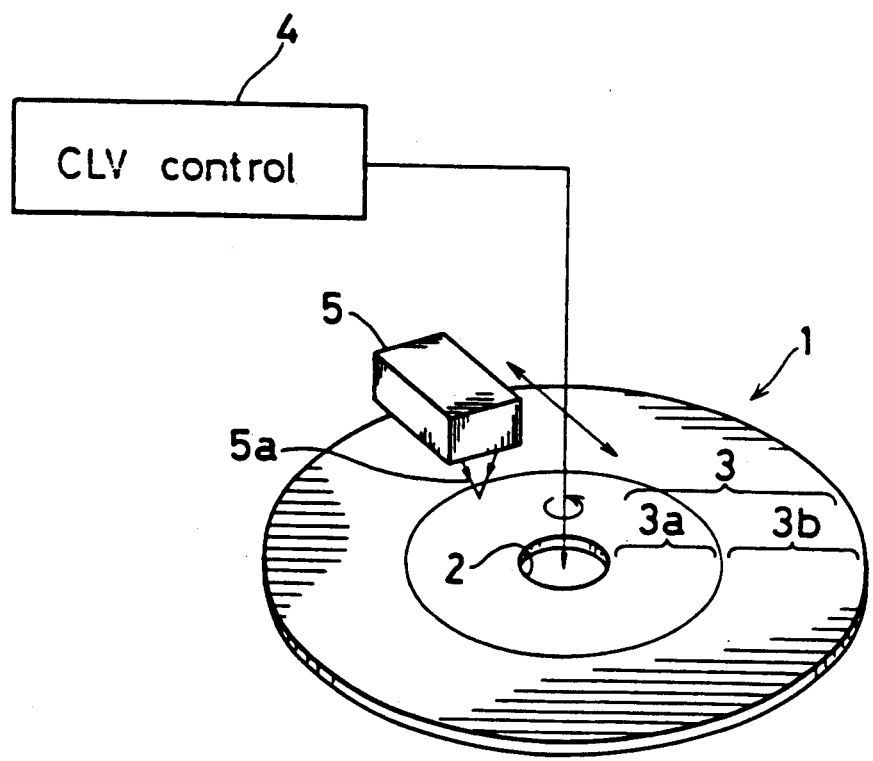
FIG. 3 is a schematic view showing a magneto-optical disk mounted on a recording and reproducing device.

As shown in FIGS. 1 and 2, the magneto-optical disk 1 is composed of a transparent disk substrate with a center hole 2 for mounting with a vertical magnetized film formed on the backside used as a magneto-optical recording medium. The magneto-optical disk 1 contains a recording region 3 formed on its surface and extending from a little outward of the center hole 2 to a little inward of its outer periphery.

The disk is designed so that various signals are magnetically recorded in spiral tracks in the recording region 3 formed from the inner periphery outward to the outer periphery. The recording region 3 is divided into two parts; one on the inner periphery side called a music region 3a and the other on the outer periphery side referred to as data region 3b.

The music region 3a receives and stores digital signals for musical information encoded by the PCM method in a data-compressed form. So, in the case of the CD method, the music region 3a ranges from 50 mm to 70 mm along the diameter and the musical information is data-compressed to some ¼ of its original size. Hence the music region can accommodate some 64 minutes of recorded music. In this music region 3a pits are preformed in the tracks so that recording and reproducing can be done by the pre-pit method. This enables quick access in recording.

The data region 3b is made to have recorded therein digital signals, for instance, numerical data and data in characters encoded and provided with parity bits so that recording and reproducing can be made with a high reliability. In the aforementioned example, this data region 3b can accomodate some 240 MB of encoded information which is equivalent to 33 minutes in play-back time. The directory for data recorded in the data region 3b is provided in the innermost peripheral portion of the aforementioned music region 3a.

In the data region 3b, recording or reproducing of signals is done by the soft-formatting method, not by the prepit method. This method is employed because recording data region 3b requires a high degree of reliability. If the pre-pit method is adopted, data recording is more troublesome due to the potential difficulty of synchronizing the preformed pits with sectors having signals recorded magnetically therein should fluctuations or similar problems occur with regard to the rotary system.

The aforementioned magneto-optical disk 1 is designed to be mounted on the recording and reproducing device. As shown in FIG. 3, the recording and reproducing device is so that the magneto-optical disk 1 with its center hole 2 is held in place with a holding arrangement (not shown) and the magneto-optical disk 1 is rotated by a rotary drive unit 4.

The rotary drive unit 4 functions as a disk rotation control device for maintaining the rotary speed of the magneto-optical disk 1 at a CLV [Constant Linear Velocity], when the music region 3a or the data region 3b of the magneto-optical disk 1 are irradiated by laser beam 5a is the music region 3a or the data region 3b.

The CLV control mentioned above is a constant linear velocity mode of control in which the rotary speed of the magneto-optical disk 1 is controlled so that the speed at which the laser beam 5a from the optical pickup 5 scans over the tracks is always kept constant regardless of the position of the moving optical pickup 5. Hence, as the laser beam 5a moves toward the outer peripheral side of the recording region 3, the linear velocity of the disk is controlled so that the rotary speed of the magneto-optical disk 1 is lowered accordingly.

In addition, the aforementioned rotary drive unit 4 may serve to control the CAV [Constant Angular Velocity] control of the rotary speed of the magneto-optical disk 1. In this case, the magneto-optical disk 1 is driven at a constant rotary speed regardless of the position of the moving optical pickup 5.

It is arranged so that the magneto-optical disk 1 is accessed by the optical pickup 5 located above its surface. The optical pickup 5 accesses the recording region 3 of the magneto-optical disk 1 through irradiation thereof by the laser beam 5a. Also, the optical pickup 5 moves radially with respect to the magneto-optical disk 1 by means of a linear drive unit (not shown).

In view of the above description, the mode of operation of the aforesaid recording and reproducing device will be described.

In accessing the music region 3a, the recording and reproducing device, as in the case of a CD, moves the optical pickup 5 from the inner peripheral side of the music region 3a to search for a predetermined portion of tracks through detection of pits in the tracks with the laser beam 5a. When the predetermined portion of tracks has been reached, the laser beam 5a is moved along the spiral tracks for the required access. In reproducing musical information, the original PCM signals can be obtained by data-elongation of the reproducing signals.

Meanwhile, for obtaining access to the data region 3b, the laser beam 5a from the optical pickup 5 is directed at the innermost peripheral part of the music region 3a for reading the contents of the directory. When the necessary sector number has been detected, the optical pickup 5 is moved to the outer peripheral side and access is made to the desired sector in the region 3b by means of the laser beam 5a. For reproducing numerical data, the reproducing signals are to be subjected to the predetermined error-detection and error-correction treatment on the basis of the given parity bits.

As to the aforementioned music region 3a, for quicker access may be accomplished by providing advance information regarding sector No., track No. and other relevant information in the form of directory, and moving the optical pickup 5 after reading the contents of the directory.

As mentioned above, in this embodiment, the device records data on the magneto-optical disk 1 in the music region 3a and the data region 3b completely separately, hence the processing of the signals recorded in the individual regions can also be done separately. Since, therefore, signal processing such as data-compression can be done freely with the signals recorded in the music region 3a, the recording time is sizably extended. Further, the signals are more reliably recorded in the data region 3b.

In recording continuous signals, it is possible to substantially increase the recording capacity of the disk by raising the utilization efficiency of the magneto-optical disk 1, and at the same time attaining an improved reliability with regard to recording of discrete signals.

Also, the rotary drive unit 4 can be CLV-controlled continuously in accessing to either region 3a or region 3b. No complicated speed control procedure is required as in the case of CD-V. Hence, the rotation control of the optical disk by the rotary drive unit 4 can be simplified.

Further, by providing a directory for controlling the items of information recorded in the magneto-optical disk 1 in the innermost peripheral part thereof, it is feasible to do quick and random access of numerical data.

As to the music region 3a, quick access is made feasible through adoption of the pre-pit method for recording or reproducing of signals. While in the data region 3b further improvement of reliability in recording and reproducing is attainable through adoption of the soft-formatting method for recording and reproducing of signals.

The invention being thus described, it may be obvious that the same may be varied in many ways. Such variations are not to be recorded as a departure from the spirit and scope of the invention, and all such modifications as would be obvious to one skilled in the art are intended to be included within the scope of the following claims.

What is claimed is:

1. An optical disk recording and reproducing device for recording and reproducing continuous analog and discrete data information to or from an optical disk, wherein said optical disk recording/reproducing device comprises:

laser light means for producing an information bearing light beam representing said continuous analog and discrete data information;

analog data processing means for compressing and elongating said analog data information;

discrete data processing means for inserting error correction codes in said discrete data information;

means for recording and reproducing continuous signals received from said analog and discrete data processing means representing said analog and discrete data information separately in different recording regions on said optical disk using said laser light means, wherein said analog and discrete data information are recorded on said optical disk; and disk rotation control means for controlling the rotation of said optical disk at a given linear speed and rotary angular speed for accessing said divided recording regions;

rotary drive means responsive to said rotation control means for rotating said disk at a predetermined constant linear velocity and constant angular velocity while reproducing and recording information from and to said disk.

2. An optical disk recording and reproducing device according to claim 1, wherein said device is capable of recording and reproducing signals to or from said optical disk of an erasable type.

3. An optical disk recording and reproducing device according to claim 1, wherein said device is capable of recording and reproducing signals to or from said optical disk of a write once-type.

4. An optical disk recording and reproducing device according to claim 1, wherein said recording and reproducing means records said continuous signals representing continuous analog information and said discrete signals representing discrete data-information in tracks on the inner peripheral side and on the outer peripheral side of said optical disk respectively.

5. An optical disk recording and reproducing device according to claim 1, wherein said recording and reproducing means further comprises means for creating a directory for controlling the items of information recorded therein.

6. An optical disk recording and reproducing device according to claim 1, wherein said recording and reproducing means records and reproduces f signals by the pre-pit method to or from said optical disk with performed pits in tracks.

7. An optical disk recording and reproducing device according to claim 1, wherein said recording and reproducing means records and produces signals by the soft-formatting method.

8. An optical disk recording and reproducing device according to claim 1, wherein said optical disk has pits preformed in said tracks only in part of said recording region so that said recording and reproducing means records and reproduces said analog information by the pre-pit method, while recording and reproducing discrete data information the soft-formatting method.

* * * * *